Feb. 20, 1951    E. J. G. LAVERDISSE ET AL    2,542,684
LIQUID FUEL BURNER FOR INDUSTRIAL FURNACES

Filed March 4, 1947    2 Sheets-Sheet 1

Inventors
EDMOND JOSEPH GHISLAIN LAVERDISSE &
JEAN JOSEPH GASPARD LORNEAU
By Haseltine, Lake & Co.
Agents

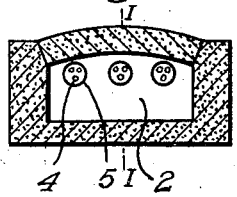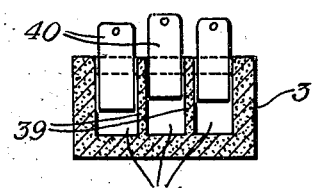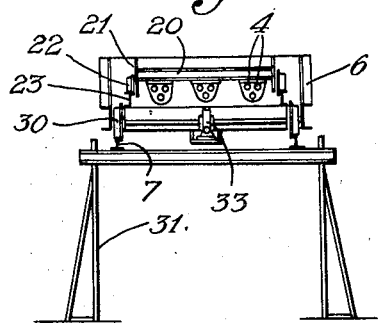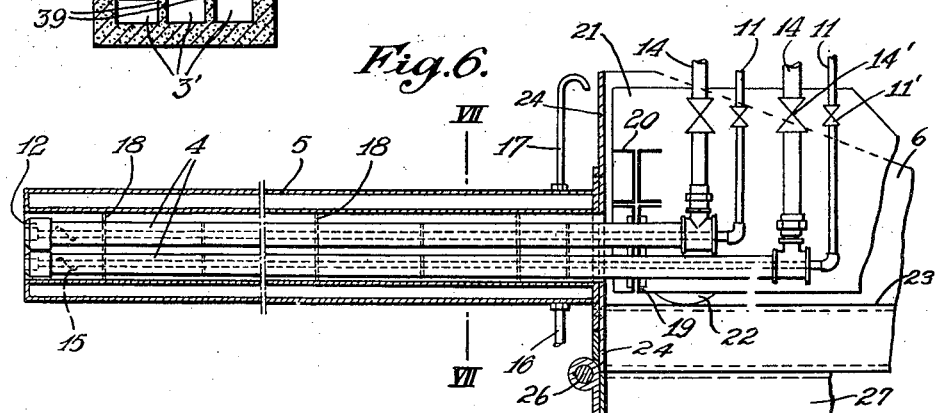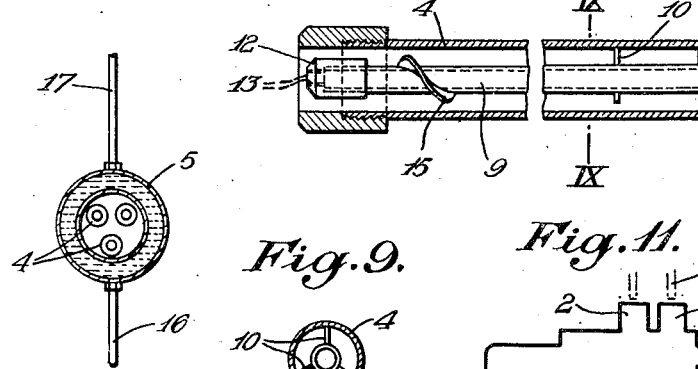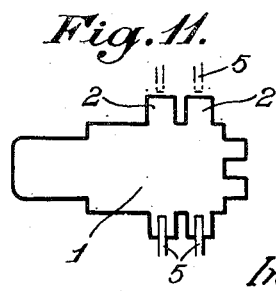

Patented Feb. 20, 1951

2,542,684

UNITED STATES PATENT OFFICE 2,542,684

LIQUID FUEL BURNER FOR INDUSTRIAL FURNACES

Edmond Joseph Ghislain Laverdisse, Auvelais, and Jean Joseph Gaspard Lorneau, Jupille, Belgium, assignors to les Glaceries de la Sambre, Societe Anonyme, Auvelais, Belgium, a Belgian company, and S. A. Belge Stein & Roubaix, Bressoux, Belgium, a Belgian company Application March 4, 1947, Serial No. 732,244
In Belgium March 19, 1946

8 Claims. (Cl. 158—4.5)

This invention relates to liquid fuel burners for industrial furnaces such as basin furnaces for glass-smelting, open-hearth furnaces for the manufacture of steel and the like.

It is well known that the use of fuel oil or tar oil as fuel for furnaces of this kind comes up against serious difficulties, as much from the thermal and technical aspect, as from the economic point of view. In fact, burners of high capacity provide a short flame that results in a local excessive rise of temperature that has a destructive effect on refractory materials. On the other hand, there is a marked lowering of efficiency owing to the difficulty of using to full advantage the heat recovered from the burnt bases. In the case of furnaces with reversible draught, the burners during the intervals when they are inoperative remain exposed to the flames issuing from the furnace, the fuel oil standing in the pipes becomes carbonised and chokes up the openings in the burner.

The object of this invention is to remove these inconveniences and to provide a burner of which the flame is similar to that of a gas-burner and may be produced at the most suitable spot with reference to the hot air inlet.

To this end, the burner in accordance with the invention consists of a series of parallel tubes arranged for longitudinal movement in the furnace wall so as to allow the fuel jet to be delivered into the main body of the hot air stream coming from the recovery unit. The burner tubes are preferably grouped into sets of which is housed in a protective casing or sheath provided with water circulation. The casings are located side by side on a substantially horizontal level and form overhung structures on carriages running on rails provided outside the furnace; this allows of adjusting the depth to which the burner is inserted in the furnace, and of completely withdrawing it from the furnace when required. The position of the tubes moreover may be varied with reference to the casings either all together or singly; they are attached for this purpose to a crosspiece fixed rigidly to a small trolley running on rails carried by the main carriage.

Owing to this arrangement, it is possible to produce a flame that spreads out like a sheet similar to that coming from gas-burners, and said flame can be formed in the very centre of the hot-air stream issuing from the recovery unit. The combined adjustment of the casings and tubes permits of precise regulation of the positioning of the flame and of the conditions of its formation.

These specific features together with additional features will be described in fuller detail with reference to the accompanying drawings, illustrating by way of example an embodiment of the burner in accordance with our invention, as applied to a glass-melting furnace.

In said drawings:

Figures 3 and 4 are cross sections respectively on lines III—III and IV—IV of Figure 2.

Figure 5 is an elevation of the burner seen in the direction of the arrows V—V (Figure 2).

Figure 6 is a longitudinal section of one of the casings of the burner on a larger scale.

Figure 7 is a cross-section on line VII—VII of Figure 6.

Figure 8 is a longitudinal section of a burner tube on a still larger scale.

Figure 9 is a cross-section on line IX—IX of Figure 8.

Figure 11 is a diagrammatic plan view of the whole furnace on a small scale.

The furnace shown comprises a basin 1, lateral combustion chambers 2 and flues 3 connected with heat recovering or regenerating units not shown.

Figure 1:
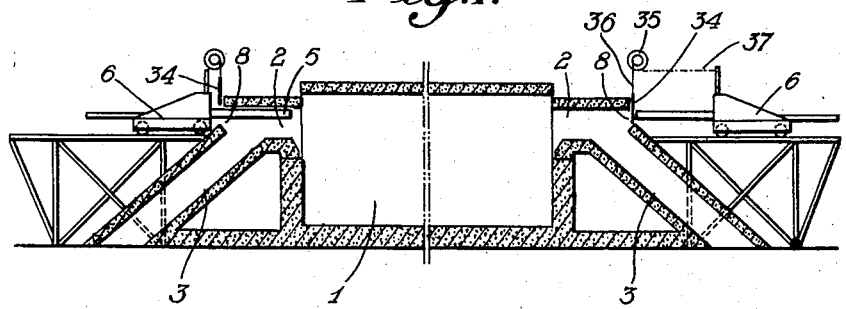
Figure 1 is a vertical section of the furnace in the plane of the burners on line I—I of Figure 3.

Each combustion chamber is provided with a burner comprising a plurality of sets of parallel iron tubes 4 housed in protecting casings 5 located side by side, the said structure being overhung and mounted on a carriage 6 running on rails 7 outside the furnace, so that the burner be inserted to the desired extent in the combustion chamber 2, or may be withdrawn entirely therefrom through an opening 8 in the furnace wall (Figure 1).

In each of the burner tubes 4 is located centrally a pipe 9 supported by crosspieces 10 and fed with fuel oil, for instance, from a pipe 11 connected with a pump. The atomizing of the oil is obtained by forcing it through the burner head 12 perforated with holes of small diameter 13 (Fig. 8).

The air is led into the tubes 4 under low pressure through a pipe 14. A spiral guide 15 imparts thereto a whirling motion that promotes the atomizing and the combustion of the fuel oil. As shown in Fig. 6, valves 11' and 14' are provided for separately controlling the supply of fuel and air to each tube so that the number of nozzles in operation can be controlled at will. It will be noticed that by varying the number of nozzles in operation the power of the flame is varied without affecting the length of the flame, and consequently without shifting the zone of highest temperature in the furnace.

In the example illustrated, the tubes 4 are housed in sets of three in casings 5 that are cooled by circulating water (Figure 6), the latter being fed through a pipe 16 and passing out through a pipe 17. Crossties 18 secured to the inner surface of the casings 5 carry and act as guides for the tubes 4 in the latter, while allowing a longitudinal movement of the tube sets in the casings.

Figure 2:
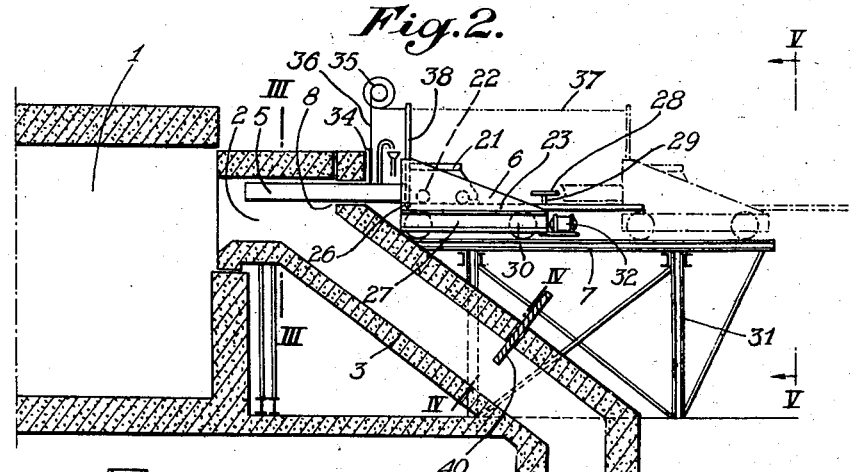
Figure 2 is a reproduction on a larger scale of a part of this section.
Figure 10:
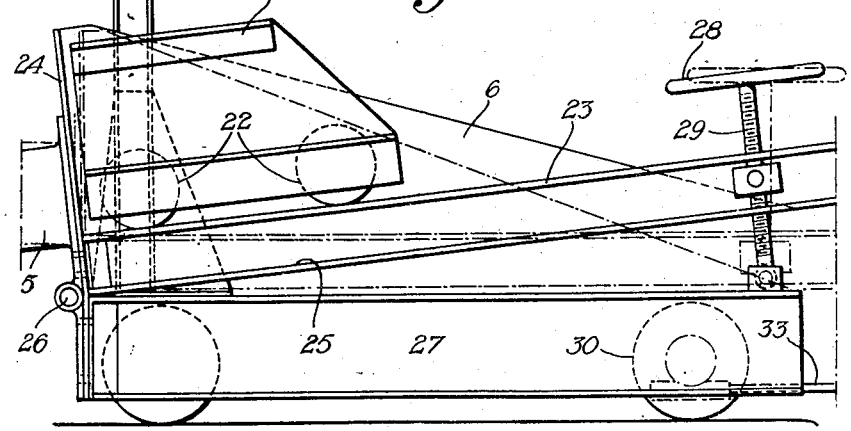
Figure 10 is a large-scale view of the carriage.

The sets of tubes 4 are attached, at their feed end, to a plate 19 fixed rigidly to a carrying crosspiece 20 on a small movable trolley 21 mounted on rollers 22 adapted to travel on rails 23 carried by the main carriage 6 (Figures 2 and 10).

By moving the trolley 21, the position of the burner nozzles 12 longitudinally of the casings 5 can be varied as required.

The casings 5 that project in front of the carriage 6 are carried by a plate 24 fixed rigidly to the rails 23 and forming therewith a frame 25 hinged at 26 to the girders 27 of the carriage 6. A handwheel 28 adapted to operate a threaded spindle 29 bearing on the carriage 6, allows of raising of one end of the frame 25 and thus of adjusting of the angle of the burner within the furnace.

The carriage 6 is provided with carrying wheels 30 that run on the track 7 built on a framework 31 outside the furnace. The forward and back motions of the burner structure may be controlled by hand, or, preferably, by means of a motor 32 adapted to drive the wheels 30 through a speed reducer 33.

A shutter 34 is adapted to close the opening 8 after the withdrawal of the burner; the raising and lowering movements of the shutter may be controlled by the change of position of the carriage 6 by means of a transmission such as that illustrated in the drawing, which comprises pulleys 35 and cables 36, 37 secured on the one hand to the shutter 34 and on the other hand to an upright 38 fixed rigidly to the carriage 6 (Fig. 10).

In operation, the burner is inserted into the combustion chamber to a sufficient depth to reach the centre of the hot-air stream fed by the flue 3 from the heat recovering or regenerating units. Owing to the presence of the protecting casings the burners are able to stay in this particular area where the temperature may exceed 1000° C., and the adjustment of the parts of the burner allows a full charge of fuel to be delivered into the hot-air stream at the most suitable spot for the combustion. The grouping in sets of the sprays at their exit from the casings and the side-by-side arrangement of the latter allows of spreading the flame in sheet-like form.

In order that each part of the burner may operate under the most desirable conditions, the flue 3 is divided by partitions 39 into as many parallel passages 3' as there are sets of tubes 4, and the sectional area of each of these passages 3' may be modified independently by means of a damper or throttle 40 (Figure 4). It is thus possible to adjust the distribution of hot air coming from the heat regenerating or recovering units and to control the oxidising or reducing atmosphere of each of the sets.

The heat efficiency of the burners may again be increased when the tubes 4 are fed with hot air taken, for instance, from the flue 3.

Figures 1 and 11 show an arrangement applied to furnaces with reversible draught. Opposite burners are alternatively inserted into and withdrawn from their combustion chambers, the burners on one side of the furnace operating when those on the other side are inoperative. In a furnace of this kind the operations must be quick, and this is helped by the use of motors 32 for the control of the burner-carrying carriages. The series of the reversing operations, working of the gates, change of fuel-oil and air feeds, movement of the burner-carrying carriages, may be controlled electrically by devices of standard pattern.

Obviously many modifications of shape and structure may be introduced to the burner illustrated, as an example, without widening the scope of my invention as defined in the accompanying claims.

We claim:

1. In an industrial furnace having a wall provided with an opening and a flue feeding hot air into the furnace through said opening, a liquid fuel burner comprising a plurality of parallel protecting casings extending into said flue, water circulating means adapted to cool said casings, a plurality of fuel feeding tubes arranged inside each casing, said casings and said tubes being arranged in such proximity to each other as to deliver a sheet of flames longitudinally of said flue into said furnace, each of said fuel feeding tubes having fuel and air supplies adjustable and operable independently of each other and independently of those of the other fuel feeding tubes, means for varying the longitudinal position of said tubes, and means for varying the angular position of said tubes.

2. In an industrial furnace having a wall provided with an opening and a flue feeding hot air into the furnace through said opening, a liquid fuel burner comprising a plurality of parallel protecting casings extending into and longitudinally of said flue, water circulating means adapted to cool the said casings, a plurality of fuel feeding tubes arranged inside each casing, each of said fuel feeding tubes having fuel and air supplies adjustable and operable independently of each other and independently of those of the other fuel feeding tubes, a track outside the furnace opposite said opening, and a carriage movable on said track, said casings with the tubes therein being supported in overhung position from said carriage.

3. In an industrial furnace having a wall provided with an opening and a flue feeding hot air into the furnace through said opening, a liquid fuel burner comprising a plurality of parallel protecting casings extending into said flue, at least one fuel feeding tube arranged inside each casing, a burner nozzle at the end of each tube, means for varying the position of said casings longitudinally thereof with respect to said flue, means for varying the angular position of said casings with respect to said flue, and means for varying the position of said tubes longitudinally thereof with respect to said casings.

4. In an industrial furnace having a wall provided with an opening and a flue feeding hot air into the furnace through said opening, a liquid fuel burner comprising a plurality of parallel water-cooled casings extending into said flue, at least one fuel feeding tube arranged inside each said casing, a track outside the furnace aligned with said opening, a carriage adapted to travel on said track in a direction parallel to said casings, said casings being carried in overhung position by said carriage, a trolley on said carriage adapted to move thereon in a direction parallel to said casings, said tubes being carried by said trolley and projecting therefrom within said casings.

5. In an industrial furnace having a wall provided with openings and a flue feeding hot air into the furnace through said opening, a liquid fuel burner comprising a plurality of parallel protecting casings extending into said flue, water circulating means adapted to cool said casings, at least one fuel feeding tube being arranged inside each casing, a track outside the furnace aligned with said opening and in alignment therewith, a carriage adapted to run on said track, a support on said carriage, said casings being secured to and projecting forwardly from said support, a trolley mounted on said carriage for longitudinal movement parallel to said track, said tubes being secured to and projecting forwardly from said trolley, and means for angularly moving said support together with said trolley with respect to said carriage.

6. In an industrial furnace having a wall provided with an opening and a flue feeding hot air into the furnace through said opening, a liquid fuel burner comprising a plurality of parallel casings extending into said flue, water circulating means adapted to cool said casings, a set of fuel feeding tubes arranged inside each casing, a track outside the furnace aligned with said opening, a carriage on said track, a tiltable support on said carriage, said casings being secured in overhung position to said support, a trolley movable on said support, said sets of tubes being secured in overhung position to said trolley, means for moving said carriage on said track, and means on said carriage for tilting said support.

7. In an industrial furnace having a wall provided with an opening and a flue feeding hot air into the furnace through said opening, a liquid fuel burner comprising a plurality of parallel casings adapted to extend into said flue into the furnace, water circulating means adapted to cool said casings, a set of fuel feeding tubes arranged inside each of said casings, a track outside the furnace in alignment with said opening, a carriage movable on said track, said casings being carried by and projecting forwardly from said carriage, a shutter adapted to close said opening in the furnace wall, and a connection between said carriage and said shutter for bringing the latter into position to close said opening when said casings are moved out of the furnace.

8. In an industrial furnace having a wall provided with an opening and a flue feeding hot air into the furnace through said opening, a liquid fuel burner comprising a plurality of parallel water cooled casings extending into said flue, a set of fuel feeding tubes arranged inside each casing, means for moving longitudinally said casings and tubes within and out from said flue to bring the jets of fuel and air mixture produced thereby into the midst of the current of hot air fed by said flue, partitions dividing said flue into as many individual ducts as there are sets of tubes, and individual dampers for controlling said individual ducts.

EDMOND JOSEPH GHISLAIN LAVERDISSE.
JEAN JOSEPH GASPARD LORNEAU.

REFERENCES CITED

The following references are of record in the file of this patent:

UNITED STATES PATENTS

| Number | Name | Date |
|---|---|---|
| 473,165 | Russell | Apr. 19, 1892 |
| 757,606 | Falk | Apr. 19, 1904 |
| 891,349 | Loder | June 23, 1908 |
| 1,052,420 | Lidstone | Feb. 4, 1913 |
| 1,160,806 | Wuestner, et al. | Nov. 16, 1915 |
| 1,192,573 | Schneider | July 25, 1916 |
| 1,391,338 | Morse | Sept. 20, 1921 |
| 1,457,557 | Smythe | June 5, 1923 |
| 1,736,675 | Steese | Nov. 19, 1929 |
| 1,775,367 | McEntee | Sept. 9, 1930 |
| 1,941,411 | Mulholland | Dec. 26, 1933 |
| 2,285,036 | Kneass | June 2, 1942 |

FOREIGN PATENTS

| Number | Country | Date |
|---|---|---|
| 158,661 | Switzerland | Feb. 1, 1933 |
| 450,531 | Great Britain | July 20, 1936 |
| 843,045 | France | Mar. 20, 1939 |